United States Patent Office 2,769,080
Patented Oct. 30, 1956

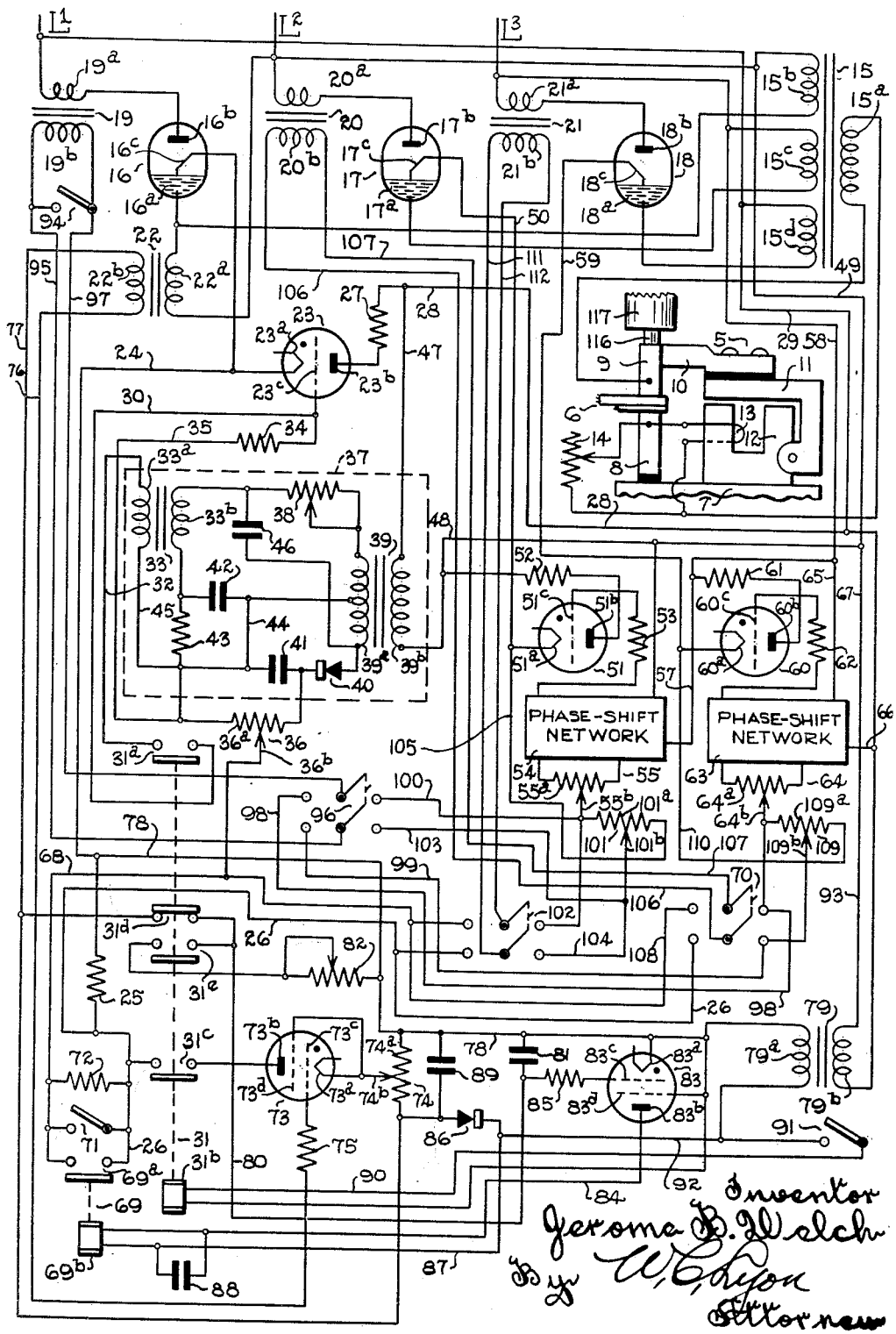

2,769,080

ELECTRIC WELDING MACHINE AND CONTROL MEANS THEREFOR

Jerome B. Welch, Wauwatosa, Wis., assignor to Cutler-Hammer, Inc., Milwaukee, Wis., a corporation of Delaware Application May 31, 1951, Serial No. 229,096

8 Claims. (Cl. 219—108)

This invention relates to an electric welding machine and control means therefor.

In the Cox et al. Patent No. 2,477,117, issued July 26, 1949, there is disclosed a welding machine, which affords supplemental pressure on the work pieces during, and/or for short periods following the flow of welding current; such pressure being effected through the medium of magnetic force means and being proportional to the value of the welding current. Heretofore that welding machine has been used with welding current control systems affording only single unidirectional welding current pulses. While this arrangement has proved to be quite successful in certain types of welding of nonferrous metals having low specific resistivity and low mass, its use has been somewhat restricted due to the single unidirectional welding pulse supply and control system. Where the job requirements call for relatively high magnitudes of welding current electrode life has been found to be low due to arcing, etc.

It is a primary object of the present invention to provide an improved welding machine embodying the magnetic force pressure means of the character disclosed in the aforementioned patent, and to provide an improved form of welding current supply and control system affording supply of single or multiple unidirectional welding current pulses of the same given polarity.

Another object is to provide a welding machine and current supply and control means of the aforementioned type which are adaptable to a wider variety of welding jobs both in connection with non-ferrous metals and ferrous metals, and which affords relatively long electrode life.

A more specific object is to provide a welding machine of the aformentioned type employing controlled power means for bringing the movable electrode into working engagement with the work, and for establishing and maintaining the initial contact pressure during welding operations.

A further object is to provide a welding current supply and control system of a novel type to supply for a polyphase supply source single unidirectional current pulses in various combinations and phase orders, and either in single or repeating series as preselected.

Another specific object is to provide a current supply and control system of the aforementioned type wherein, for either single or multiple pulse operation, the single or first current pulse is always supplied from a certain phase, and wherein for multiple pulse operation supply of current from said certain phase, or any succeeding phase, is utilized to initiate supply of a current pulse from another phase, and A still further object is to provide a current supply and control system of the aforementioned character wherein the effective value of the current pulses supplied from each of the phases may be adjusted within limits.

Other objects and advantages of the invention will hereinafter appear.

The single figure of the drawing is a schematic and diagrammatic showing of a welding machine and a current supply and control system therefor, which will now be described. It is to be understood that the preferred embodiment shown in the drawing is susceptible of various modifications in respect of details without departing from the scope of the appended claims.

Referring to the drawing, it shows a welding head 5 for resistance welding of work 6. Welding head 5 comprises a base 7, a stationary lower welding electrode 8 mounted on but electrically insulated from base 7, and a cooperating movably supported upper electrode 9. Electrode 9 is supported on an arm 10 which is rigidly secured to but electrically insulated from an oscillatable armature 11 which is hinged to a U-shaped electromagnet frame 12. Electromagnet frame 12 is provided with an energizing coil 13 which at one end is electrically connected to electrode 8 and at its other end to an adjustable resistor 14 and the upper-end terminal of secondary winding $15^a$ of a welding transformer 15. Electrode 8 is electrically connected to the adjusting element of adjustable resistor 14 and electrode 9 is electrically connected to the lower-end terminal of winding $15^a$ of transformer 15.

Welding head 5 as thus far described is like the welding head shown in the aforementioned Cox et al. patent. In addition, electrode 9 is adapted to be moved into and out of engagement with work 6 through the medium of a connecting rod 116 which has connection with electrode 9 and a piston (not shown) which is adapted to move in reverse directions under fluid power in a cylinder 117. It may be assumed that electrode 9 normally assumes an upper extreme position out of engagement with the work 6 as afforded through the drive of connecting rod 116, and upon initiation of a welding operation is driven downwardly into engagement with said work piece by movement of said connecting rod under fluid power. The source of fluid power and means for controlling the application of the same to cylinder 117 may be any one of a number of well known types, but preferably one affording a range of adjustment of the pressure applied to the piston so that the initial contact pressure of electrode 9 on the work piece 6 may be correspondingly adjusted to suit particular conditions.

Welding transformer 15 is provided with three primary windings $15^b$, $15^c$ and $15^d$. Welding current is induced in secondary winding $15^a$ whenever current flows in one of the primary windings $15^b$, $15^c$ and $15^d$. Current induced in winding $15^a$ flows through electrode 8, work piece 6, electrode 9 and energizing coil 13. Flow of current through energizing coil 13 induces a flux in electromagnet frame 12 and thereby exerts an attracting force on armature 11. The pressure of electrode 9 on the work is thereby increased proportionately to the magnitude of the welding current in the manner aforedescribed in the Cox et al. patent.

Whereas the system of the Cox et al. patent affords supply of single unidirectional pulses to the primary of the welding transformer, the present system provides for supplying single or multiple unidirectional pulses to the welding transformer derived from a three phase alternating current supply source.

Primary winding $15^b$ is connected at its upper end terminal to line $L^2$ of a three phase alternating current supply source and is connected at its lower-end terminal to cathode $16^a$ of an ignitron type power tube 16. Primary winding $15^c$ is connected at its upper-end terminal to line $L^3$ of said supply source and is connected at its lower-end terminal to cathode $17^a$ of a power tube 17 like tube 16. Primary winding $15^d$ is connected at its upper-end terminal to line $L^1$ of said source and at its lower-end terminal to cathode $18^a$ of a tube 18, like tubes 16 and 17.

Transformer 15 is preferably constructed so that it has a single, closed magnetic circuit on which windings $15^a$, $15^b$, $15^c$ and $15^d$ are wound. Windings $15^b$, $15^c$ and $15^d$ are either so wound, or their connections so made that the direction of current flow of each will be the same.

Tubes 16, 17 and 18 are provided with anodes $16^b$, $17^b$ and $18^b$, respectively, and are further provided with ignitor electrodes $16^c$, $17^c$ and $18^c$, respectively. Anodes $16^b$, $17^b$ and $18^b$ are connected to lines $L^1$, $L^2$ and $L^3$, in series with primary windings $19^a$, $20^a$ and $21^a$, respectively, of current transformers 19, 20 and 21. Tubes 16, 17 and 18 when rendered conducting during their respective conducting half cycles supply unidirectional current pulses to primary windings $15^b$, $15^c$ and $15^d$ of welding transformer 15.

The part of the control system now to be described comprises the regulating circuits for controlling the firing of tubes 16, 17 and 18. Tube 16 additionally has its cathode $16^a$ connected to line $L^2$ in series with a primary winding $22^a$ of a transformer 22 which has a secondary winding $22^b$. The ignitor electrode $16^c$ of tube 16 is connected to cathode $23^a$ of a gas filled tube 23, which is preferably of the so-called "Thyratron" type. Cathode $23^a$ of the latter tube is also connected in series with a conductor 24 and a resistor 25 to a conductor 26. Tube 23 has its anode $23^b$ connected in series with a resistor 27 and a conductor 28 to a conductor 29, which is connected to the point common to the connection between line $L^1$ and the aforementioned upper-end terminal of primary winding $15^d$ of transformer 15.

Control grid $23^c$ of tube 23 is connected through a conductor 30 to the left-hand contact of normally open contacts $31^a$ of a relay 31 which has an electromagnetic operating coil $31^b$. The right-hand contact of contacts $31^a$ is connected through a conductor 32 to the upper-end terminal of secondary winding $33^a$ of a transformer 33 which has a primary winding $33^b$. Control grid $23^c$ of tube 23 is also connected in series with a resistor 34 and a conductor 35 to the left-hand terminal of resistance element $36^a$ of a potential divider 36 which has an adjusting element $36^b$.

Transformer 33 is a component of a network 37 affording supply of peaked voltage pulses superimposed on a constant but adjustable unidirectional voltage bias to control electrode $23^c$ of tube 23. The upper-end terminal of winding $33^b$ is connected in series with an adjustable resistor 38, a center-tapped secondary winding $39^a$ of an input transformer 39 which has a primary winding $39^b$, a half-wave rectifier 40, and a capacitor 41 to the lower-end terminal of winding $33^a$ of transformer 33. The lower-end terminal of winding $33^b$ of transformer 33 is connected in series with a capacitor 42 to the center-tap terminal of winding $39^a$ of transformer 39, and is also connected in series with a resistor 43 to the point common between the lower-end terminal of winding $33^a$ and capacitor 41. A conductor 44 is connected at one end to the point common to capacitor 42 and the aforementioned center-tap terminal of winding $39^a$, and is connected at its other end to the point common between capacitor 41 and resistor 43. A conductor 45 is connected at one end to the point common to the lower-end terminal of winding $33^a$, resistor 43 and conductor 44, and is connected at its lower end to the point common to conductor 35 and the left-hand end terminal of resistance element $36^a$ of potential divider 36. A capacitor 46 is connected at its upper-end terminal to the point common between the upper-end terminal of winding $33^b$ and adjustable resistor 38, and is connected at its lower-end terminal to the lower-end terminal of center-tap winding $39^a$. The upper-end terminal of primary winding $39^b$ of transformer 39 is connected through a conductor 47 to the point common to resistor 27 and conductor 28, and the lower-end terminal of winding $39^b$ is connected through a conductor 48 to a conductor 49 which is connected to the point common between power supply line $L^2$ and the upper-end terminal of primary winding $15^d$ of transformer 15. The right-hand end terminal of resistance element $36^a$ of potential divider 36 is connected to the point common between rectifier 40 and capacitor 41 in network 37.

When contacts $31^a$ of relay 31 are closed network 37 and potential divider 36 afford supply to control grid $23^c$ of a unidirectional bias on which are superimposed periodic highly peaked alternating voltage pulses which are disposed in adjustable time phase relation to the alternating potential to which anode $23^b$ of tube 23 is subjected. The phase relation of the peaked voltage pulses is adjustable through the medium of adjustable resistor 38 and the level of the unidirectional bias is varied as will be hereinafter described.

The ignitor electrode $17^c$ of power tube 17 is connected through a conductor 50 to the cathode $51^a$ of a tube 51, like tube 23. Tube 51 is provided with an anode $51^b$ which is connected in series with a resistor 52 to conductor 48, which as aforeindicated has connection to supply line $L^2$ through conductor 49. Tube 51 also has a control electrode $51^c$ which is connected in series with a resistor 53 to a network 54, which is identical with network 37.

Network 54 has connected thereto the opposite end terminals of resistance element $55^a$ of a potential divider 55 which has an adjusting element $55^b$. It may be assumed that the connections of resistance element $55^a$ in network 54 are like that shown and described in connection with resistance element $36^a$ of potential divider 36 and network 37. A conductor 56 connects phase shift network 54 to conductor 48, and a conductor 57 connects such network to a conductor 58 which is connected to the point common to supply line $L^3$ and the upper-end terminal of primary winding $15^c$ of transformer 15.

The igniter electrode $18^c$ of power tube 18 is connected through a conductor 59 to cathode $60^a$ of tube 60, which is like tubes 23 and 51. Tube 60 has an anode $60^b$ which is connected in series with a resistor 61 to conductor 57, which as aforeindicated has connection to supply line $L^3$ through conductor 59. Tube 60 is also provided with a control electrode $60^c$ which is connected in series with a resistor 62 to a phase-shift network 63 which is also identical with network 37.

Network 63 has connected therewith the opposite end terminals of resistance element $64^a$ of a potential divider 64 which has an adjusting element $64^b$. It may be assumed that the connections of resistance element $64^a$ with phase-shift network 63 are like those shown and described in connection with resistance element $36^a$ of potential divider 36 and network 37. A conductor 65 connects network 63 to conductor 58, and network 63 is connected through a conductor 66 and a conductor 67 to conductor 29, which as aforeindicated has connection with power supply line $L^2$.

Networks 54 and 63 together with their associated potential dividers 55 and 64 afford supply to control grids $51^c$ and $60^c$ of tubes 51 and 60, respectively, of unidirectional voltage bias on which are superimposed highly peaked alternating voltage pulses, similar to that afforded control grid $23^c$ of tube 23 by network 37 and potential divider 36.

The portion of the control system now to be described pertains to the means for rendering tube 23 conducting initially, for selectively rendering tube 23 blocked or unblocked from further conduction, for selecting which, if any, of the tubes 17 and 18 will be rendered conducting and the order thereof, for selecting repeat or non-repeat operation of the system, and for regulating the duration of repeat operation of the system. More particularly, adjusting element $36^b$ of potential divider 36 is connected to a conductor 68 which is connected at one end to the left-hand contact of contacts $69^a$ of a relay 69, and which is connected at its other end to the upper contact of the left-hand pair of contacts of a double pole, double throw switch 70. The right-hand contact of contacts $69^c$ of relay 69 has connected thereto one end of conductor 26, which has its other end connected to the lower of the left-hand pair of contacts of switch 70. A single pole switch 71 and a resistor 72 are connected across conductors 26 and 68 in parallel relation to contacts 69$^a$ of relay 69, which has an operating winding 69$^b$.

A gas filled electron tube 73 has its cathode 73$^a$ and screen grid 73$^d$ connected to adjusting element 74$^b$ of a potential divider 74, and said tube has its anode 73$^b$ connected to the right-hand contact of normally open contacts 31$^c$ of relay 31. The left-hand contact of contacts 31$^c$ are connected to conductor 26 at a point intermediate resistors 25 and 72. Control grid 73$^c$ of tube 73 is connected in series with a resistor 75 and a conductor 76 to the lower-end terminal of winding 22$^b$ of transformer 22.

The upper-end terminal of winding 22$^b$ is connected through a conductor 77 to the lower-end terminal of resistance element 74$^a$ of potential divider 74. The upper-end terminal of resistor element 74$^a$ is connected to a conductor 78, which is connected at its right-hand end to the upper-end terminal of secondary winding 79$^a$ of a transformer 79, and which is connected at its left-hand end to conductor 24 intermediate resistor 25 and cathode 23$^a$ of tube 23.

Relay 31 has the left-hand contact of a pair of normally closed contacts 31$^d$ connected to conductor 77, and the right-hand contact of said contacts are connected by a conductor 80 to the lower-end terminal of a capacitor 81 which is connected at its upper-end terminal to conductor 78. The right-hand contact of normally open contacts 31$^e$ is connected to conductor 80 and the left-hand contact of the latter contacts is connected in series with an adjustable resistor 82 to conductor 78 intermediate the connections of the latter with conductor 27 and resistance element 74$^a$ of potential divider 74.

A gaseous electron tube 83 has its cathode 83$^a$ and screen grid 83$^d$ connected to conductor 78 intermediate the connections of the latter with the upper-end terminal of secondary winding 79$^a$ of transformer 79 and capacitor 81. Anode 83$^b$ of tube 83 is connected through a conductor 84 to one end terminal of operating coil 69$^b$ of relay 69. Control grid 83$^c$ is connected in series with a resistance 85 to the point common to the connection between conductor 80 and capacitor 81.

A half-wave rectifier 86 is connected at its high potential terminal to the lower-end terminal of resistance element 74$^a$ of potential divider 74, and is connected at its low potential terminal through a conductor 87 to the other terminal of operating coil 69$^b$ of relay 69. A capacitor 88 is connected across the terminals of operating coil 69$^b$. A capacitor 89 is connected at its upper-end terminal to conductor 78, intermediate resistance element 79$^a$ and capacitor 81, and is connected at its lower-end terminal to a point common to resistance element 74$^a$ and rectifier 86.

Operating coil 31$^b$ of relay 31 has one end terminal thereof connected through a conductor 90 to one terminal of a switch 91, which has its other terminal connected to a conductor 92 which conductor has connection with the lower-end terminal of secondary winding 79$^a$ of transformer 79, and with conductor 87 intermediate rectifier 86 and the first mentioned end terminal of coil 69$^b$ of relay 69.

Transformer 79 has the upper-end terminal of its primary winding 79$^b$ connected for power supply to conductor 49 through conductor 93, and winding 79$^b$ has its lower-end terminal connected for power supply to conductor 29 through the aforementioned conductor 67.

Secondary winding 19$^b$ of current transformer 19 has connected across its end terminals the terminals of a single pole switch 94, which when closed serves as a means for short circuiting the voltage induced in winding 19$^b$. The left-hand end terminal of winding 19$^b$ is connected through a conductor 95 to one terminal of a movable contactor of a double pole, double throw switch 96, and the right-hand end terminal of said winding is connected through a conductor 97 to the other terminal of the movable contactor of switch 96.

The upper of the left-hand pair of contacts of switch 96 is connected through a conductor 98 to the upper of the right-hand pair of contacts of switch 70, and the lower of said left-hand pair of contacts of switch 96 is connected through a conductor 99 to the lower of said right-hand pair of contacts of switch 70. The upper of the right-hand pair of contacts of switch 96 are connected through a conductor 100 to adjusting element 55$^b$ of potential divider 55 and the left end terminal of resistance element 101$^a$ of a potential divider 101, which has an adjusting element 101$^b$ connected to the lower of the right-hand contacts of switches 96 and 102, through conductors 103 and 104, respectively. Potential divider 101 has the right-hand end of its resistance element 101$^a$ connected to cathode 51$^a$ of tube 51 through a conductor 105. The upper of the right-hand contacts of switch 102 is connected to adjusting element 55$^b$ and the left-hand end of resistance element 101$^a$.

The left-hand end terminal of secondary winding 20$^b$ of transformer 20 is connected through a conductor 106 to one terminal of the movable contactor of switch 70, and the right-hand end terminal of winding 20$^b$ is connected through a conductor 107 to the other terminal of the movable contactor of switch 70.

The upper of the left-hand pair of contacts of switch 70 is connected through a conductor 108 to conductor 68 and to the upper of the left-hand pair of contacts of switch 102, like switches 70 and 96. The lower of the left-hand contacts of switch 70 is connected to conductor 26 which also has connection with the lower of the left-hand contacts of switch 102. The upper of the right-hand pair of contacts of switch 70 is also connected to adjusting element 64$^b$ of potential divider 64 and the left end of resistance element 109$^a$ of a potential divider 109. The lower of said right-hand contacts of switch 70 is connected to adjusting element 109$^b$ of potential divider 109. The right end of resistance element 109$^a$ of potential divider 109 is connected through a conductor 110 to cathode 60$^a$ of tube 60.

The left end terminal of winding 21$^b$ is connected through a conductor 111 to one terminal of the movable contactor of switch 102, and the right end terminal of the latter winding is connected through a conductor 112 to the other terminal of the movable contactor of switch 102.

Switch 91 is the master control switch, which when closed initiates operation of the system for supply of welding current to welding head 5. Switches 70, 96 and 102 are selector switches through the medium of which the number and order of current pulses supplied to transformer 15 may be set as desired. Switch 71 is a switch through the medium of which "repeat" or "nonrepeat" operation of the system can be selected.

By proper setting of the switches 70, 71, 94, 96 and 102 the system can be conditioned to afford any of the following types of operation:

(a) Supply of a single unidirectional current pulse to primary winding 15$^b$ of transformer 15 only for each operation of switch 91.

(b) Supply of a single series of unidirectional current pulses to primary windings 15$^b$, 15$^c$ and 15$^d$ of transformer 15, in that order, for each operation of switch 91.

(c) Supply of a single series of unidirectional current pulses to primary windings 15$^b$, 15$^d$ and 15$^c$, in that order, for each operation of switch 91.

(d) Supply of a single series of unidirectional current pulses to primary windings 15$^b$ and 15$^c$, in that order, for each operation of switch 91.

(e) Supply of a single series of unidirectional current pulses to primary windings 15$^b$ and 15$^d$, in that order, for each operation of switch 91.

7

(f) Supply of repeating series of unidirectional current pulses to primary windings 15ᵇ, 15ᶜ and 15ᵈ, in any of the combinations and orders indicated in (b) through (e), for a predetermined, adjustable time interval for each operation of switch 91.

The operation of the system in the various ways indicated under (a) through (f), above, will now be described.

It may be assumed that prior to closure of switch 91 that fluid power has been applied to the piston in cylinder 117 to afford movement of electrode 9 into engagement with the work 6. In practice switch 91 may be a pressure switch which closes when the fluid pressure on the top of the piston in cylinder 117 builds up to a desired value, to insure that the desired initial contact pressure is applied on the work pieces prior to the flow of welding current.

In order to afford the type of operation indicated under (a) above, switches 71 and 94 must be closed, and switch 96 must be maintained in its central or open position shown in the drawing. It will be noted that at all times resistance element 74ᵃ of potential divider 74 has impressed thereacross a rectified unidirectional potential, derived from the A. C. potential induced in secondary winding 79ᵃ of transformer 79 through the medium of rectifier 86 and capacitor 89. Cathode 23ᵃ of tube 23 in the at rest condition of the system is subjected to a unidirectional bias equal to the potential level of adjusting element 36ᵇ of potential divider 36, minus the combined potential drops across resistors 25 and 72 in series. When switch 91 is closed an A. C. energizing circuit for operating coil 31ᵇ of relay 31 is completed from winding 79ᵃ of transformer 79 through conductors 90 and 92. Relay 31 is thus operated to effect closure of its contacts 31ᵃ, 31ᶜ and 31ᵉ and opening of its contacts 31ᵈ.

Closure of contacts 31ᵃ completes circuit connections from network 37 to control grid 23ᶜ of tube 23. Control grid 23ᶜ is then subjected to the influence of network 37, which as aforeindicated subjects such grid to a unidirectional bias on which is superimposed periodic highly peaked A. C. voltage pulses. The unidirectional bias to which grid 23ᶜ is subjected is sufficiently high relative to the unidirectional bias to which cathode 23ᵃ is subjected that the first peaked voltage pulse impressed on grid 23ᶜ following closure of contact 31ᵃ renders tube 23 conducting.

Conduction of tube 23 causes current flow from line L¹, through conductors 29 and 28, resistor 27, tube 23, ignitor electrode 16ᶜ and cathode 16ᵃ of tube 16, to line L² to thereby initiate conduction of tube 16. When tube 16 is conducting current flows from line L¹, through winding 19ᵃ of transformer 19, tube 16, and then through winding 15ᵇ of transformer 15, and also through winding 22ᵃ of transformer 22, to line L². As aforeindicated, a current pulse will thereby be induced in secondary winding 15ᵃ of transformer 15, which results in a corresponding flow of welding current through electrode 8, work 6 and electrode 9, and in energization of coil 13 of magnet frame 12, to afford increase in pressure exerted by electrode 9 on work piece 6 in proportion to the welding current.

Flow of current through winding 22ᵃ of transformer 22 induces a voltage in secondary winding 22ᵇ and this induced voltage, through the medium of conductors 76 and 77, is impressed across control grid 73ᶜ and cathode 73ᵃ of tube 73 to render the latter conducting. Tube 73, due to the aforementioned closure of contacts 31ᶜ, conducts rectified A. C. current, and remains conducting so long as switch 91 remains closed. Conduction of tube 73 results in an increase in the value of the unidirectional bias on cathode 23ᶜ of tube 23 which value is then equal to the potential level of adjusting element 74ᵇ of potential divider 74, minus the potential drop across resistor 25. The change in value of the bias on cathode 23ᵃ is of

8 such magnitude relative to the unidirectional bias to which control grid 23ᶜ is subjected by network 37 that the periodic peaked voltage pulses impressed on control grid 23ᶜ by network 37 are ineffective to render tube 23 again conducting. Consequently, tube 16 cannot again be fired following its single period of conduction. Thus under the aforementioned setting of switches 71, 94 and 96, only a single unidirectional current pulse will be supplied to primary winding 15ᵇ for each operation of switch 91.

To afford the type of operation indicated under (b) above, it is required the switch 71 be closed, switch 94 be opened, switches 70 and 96 be operated so that their contactors engage with their respective right-hand pairs of contacts, and that switch 102 be operated so that its contactors engage with its left-hand pair of contacts. When switch 91 is then closed, the system initially functions as hereinbefore described for operation (a), above, to effect conduction of tube 16 and supply of a unidirectional current pulse of a given polarity to primary winding 15ᵇ of transformer 15, etc.

As aforeindicated, conduction of tube 16 results in current flow through winding 19ᵃ of transformer 19, and such current flow induces a voltage in winding 19ᵇ of the latter transformer. This induced voltage is impressed, through the medium of conductors 95 and 97, switch 96, and conductors 100 and 103, across the point common to adjusting element 55ᵇ of potential divider 55 and the left end of resistance element 101ᵃ of potential divider 101, and adjusting element 101ᵇ of potential divider 101. Prior to the occurrence of such voltage pulse, the relationship of the unidirectional biases on cathode 51ᵃ and that afforded control grid 51ᶜ by network 54 and resistance element 55ᵃ of potential divider 55 is such that the periodic peaked voltage pulses impressed on grid 51ᶜ would be ineffective to render tube 51 conducting. When the voltage pulse derived from winding 19ᵇ is impressed as aforeindicated, the bias on control grid 51ᶜ is momentarily raised to such an extent that the next peaked voltage pulse impressed on said control grid 51ᶜ by network 54 renders tube 51 conducting.

Conduction of tube 51 results in conduction of tube 17, flow of a unidirectional current pulse of the same given polarity through primary winding 15ᶜ of transformer 15, and current flow through winding 20ᵃ of transformer 20, in the manner aforedescribed in connection with tube 16, winding 15ᵇ of transformer 15, and winding 19ᵃ of transformer 19.

Flow of current through winding 20ᵃ induces a voltage pulse in winding 20ᵇ of transformer 20, and such voltage pulse, through the medium of conductors 107 and 108, and switch 102 is impressed across the point common to adjusting element 64ᵇ of potential divider 64 and the left end of resistance element 10ᵃ of potential divider 110, and adjusting element 110ᵇ of the latter divider. Such voltage pulse functions in the same manner aforedescribed in connection with tube 51 to render tube 60 conducting.

Conduction of tube 60 results in conduction of tube 18, flow of a unidirectional current pulse of the same given polarity through primary winding 15ᵈ of transformer 15, and current flow through winding 21ᵃ of transformer 21, in the manner as aforedescribed in connection with tubes 16 and 17, primary windings 15ᵇ and 15ᶜ of transformer 15 and windings 19ᵃ and 20ᵃ of transformers 19 and 20, respectively.

The voltage pulse induced in winding 21ᵇ of transformer 21 resulting from current flow in winding 21ᵃ is short-circuited through the then closed switch 71. Tube 73, having been rendered conducting following conduction of tube 16, prevents tube 23 from again being rendered conducting.

Thus it will be seen that with the system set to afford the type of operation above described under (b) three successive welding current pulses will be induced in secondary winding 15ᵃ of transformer, such pulses being separated in phase at least 120 electrical degrees. These current pulses will each flow through electrode 8, work piece 6 and electrode 9, and will also flow through energizing coil 13 of magnet frame 12 to afford increase in pressure of electrode 9 on the work piece 9 proportional to the value of the current pulse.

In order to obtain the type of operation indicated under (c) above it is required that switch 71 by closed, switch 94 be open, switches 70 annd 96 be operated so that their contactors engage with their respective left-hand pairs of contacts, and switch 102 be operated so that its movable contactors engage its right-hand pair of contacts. With this setup of the system tube 16 will fire first, then tube 18 and then tube 17. Consequently the order of current pulses supplied to the primary windings of transformer 15 will be 15ᵇ, 15ᵈ and 15ᶜ.

To obtain the type of operation indicated under (d) switch 71 should be closed, switch 94 be open, switch 96 operated so that its contactors engage with its right-hand pair of contacts, and switch 70 operated so its contactors engage with its left-hand pair of contacts. Tubes 16 and 17 will then fire in that order to supply current pulses to primary winding 15ᵇ and 15ᶜ of transformer 15.

The type of operation indicated under (e) will be afforded when switch 71 is opened, switch 94 opened, switch 96 operated to engage its left-hand pair of contacts, and switch 102 operated to engage its left-hand pair of contacts. Tubes 17 and 18 will then fire in that order to supply current pulses to windings 15ᵇ and 15ᵈ of transformer 15 in the same order.

As indicated under (f) above, the system may be set to afford repeating series of pulses to the primary windings of transformer 15 in any of the combinations and orders indicated under (b) through (e) above. The settings of the switches will be the same as indicated for each of the types of operation (b) through (e), except that switch 71 must be open in each instance. With switch 71 open, the voltage pulse resulting from the conduction of the last firing power tube in the first series of power tube firings will be impressed across resistor 72. This voltage pulse is sufficiently high to overcome the effect of conduction of tube 73, which as aforeindicated changes the relative values of the unidirectional biases on cathode 23ᵃ and grid 23ᶜ of tube 23 to such an extent that tube 23 is "blocked" from further conduction. Thus the last mentioned voltage pulse effectively raises the level of the bias on grid 23ᶜ relative to cathode 23ᵃ to such an extent that the next peaked voltage pulse impressed on grid 23ᶜ by network 37 will effect conduction of tube 23.

So long as tube 83 remains non-conducting the particular series of pulses for which the system is set to supply will be repeated, assuming of course that switch 91 is maintained closed. In the at rest condition of the system contacts 31ᵈ of relay 31 will be closed and contacts 31ᵉ will be open. The capacitor 81 consequently will be charged through its lower terminal to a unidirectional potential, through the medium of resistance element 74ᵃ of potential divider 74, conductor 77, the then closed contacts 31ᵈ and conductor 80, such that control grid 83ᶜ of 83 is rendered sufficiently negative with respect to its cathode 83ᵃ that conduction of tube 83 is blocked. When contacts 31ᵈ open and contacts 31ᵉ close as a result of operation of relay 31, capacitor 81 is disconnected from its aforementioned charging circuit and is connected to discharge through conductor 89, contacts 31ᵉ and adjustable resistor 82. The rate of discharge of capacitor 81 depends upon the adjustment of adjustable resistor 82 and when it discharges sufficiently the potential of grid 83ᶜ of tube 83 will be raised sufficiently high relative to that of cathode 83ᵃ that tube 83 will be rendered conducting.

Conduction of tube 83 results in energization of operating winding 69ᵇ of relay 69, which then operates to close its contacts 69ᵃ. Closure of contacts 69ᵃ has the same effect as closure of switch 71 has on the behavior of the control system. Consequently closure of contacts 69ᵃ permits the "blocking" effect provided by the then conducting tube 73 to predominate and prevent tube 23 from again being rendered conducting.

I claim:

1. In combination, a polyphase alternating current supply source, at least two like translating devices, at least two normally non-conducting electron tubes respectively having their main discharge paths connected across different phases of said source in circuit with an associated translating device and having control electrodes, means in circuit with the control electrode of one of said tubes and said source and being operable to render said one tube conducting to supply its associated translating device with a unidirectional current pulse of given polarity, and means in circuit with the control electrode of the other tube and being responsive to current conduction by said one tube to render said other tube conducting to supply its associated translating means with a unidirectional current pulse of said given polarity.

2. In combination, a polyphase alternating current supply source, at least two like translating devices, at least two normally non-conducting electron tubes respectively having their main discharge paths connected across different phases of said source in circuit with an associated translating device and having control electrodes, means in circuit with the control electrode of one of said tubes and said source and being operable to render said one tube conducting to supply its associated translating device with a unidirectional current pulse of given polarity, means in circuit with the control electrode of the other tube and being responsive to current conduction by said one tube to render said other tube conducting to supply its associated translating device with a unidirectional current pulse of said given polarity, and means in circuit with said first mentioned means and being responsive to current conduction by said one tube to prevent reoperation of said first mentioned means.

3. In combination, a polyphase alternating current supply source, a welding transformer having at least two primary windings and secondary winding means for connection in a welding circuit, at least two normally non-conducting electron tubes having their main discharge paths connected across different phases of said source in circuit with an associated primary winding and having control electrodes, means in circuit with the control electrode of one of said tubes and said source and including a switch operable to closed position to render said one tube conducting to supply its associated primary winding with a unidirectional current pulse of a given polarity, means in circuit with the control electrode of the other tube and being responsive to current conduction by said one tube to render the other tube conducting to supply its associated primary winding with a unidirectional current pulse of said given polarity, and means in circuit with the first mentioned means and being responsive to current conduction by said one tube to prevent said first mentioned means from rendering said one tube conducting again pending repeat operation of said switch.

4. In combination, a polyphase alternating current supply source, a welding transformer having at least two primary windings and secondary winding means for connection in a welding circuit, at least two normally non-conducting electron tubes having their main discharge paths connected across different phases of said source in circuit with an associated primary winding and having control electrodes, means in circuit with the control electrode of one of said tubes and said source and including a switch operable to closed position to render said one tube conducting to supply its associated primary winding with a unidirectional current pulse of a given polarity, means in circuit with the control electrode of the other tube and being responsive to current conduction by said one tube to render the other tube conducting to supply its associated primary winding with a unidirectional current pulse of said given polarity, means in circuit with the first mentioned means and being responsive to current conduction by said first tube to normally prevent said first mentioned means from again rendering said one tube conducting pending repeat operation of said switch, and means responsive to current conduction of said other tube and being rendered effective selectively to cause the first mentioned means to render said one tube conducting in response to conduction of said other tube.

5. In combination, a polyphase alternating current supply source, a welding transformer having at least two primary windings and secondary winding means for connection in a welding circuit, at least two normally non-conducting electron tubes having their main discharge paths connected across different phases of said source in circuit with an associated primary winding and having control electrodes, means in circuit with the control electrode of one of said tubes and said source and including a switch operable to closed position to render said one tube conducting to supply its associated primary winding with a unidirectional current pulse of a given polarity, means in circuit with the control electrode of the other tube and being responsive to current conduction by said one tube to render the other tube conducting to supply its associated primary winding with a unidirectional current pulse of said given polarity, means in circuit with the first mentioned means and being responsive to current conduction by said first tube to normally prevent said first mentioned means from again rendering said one tube conducting pending repeat operation of said switch, means responsive to current conduction of said other tube and being rendered effective selectively to cause said first mentioned means to render said one tube conducting again in response to conduction of said other tube, and means rendered effective as a result of closure of said switch and operating after a preselected time interval to render said means responsive to current conduction of said other tube ineffective.

6. In combination, a three phase alternating current supply source, a welding transformer having three primary windings and having secondary winding means for connection in a welding circuit, three normally non-conducting electron tubes, each of said tubes having a control electrode and having its main discharge path connected across a different phase of said source in circuit with an associated primary winding of said transformer, means in circuit with the control electrode of one of said tubes and said source and including a switch operable to render said one of said tubes conducting, means in circuit with the first mentioned means and responsive to current conduction by said one of said tubes to normally prevent said first mentioned means from again rendering said one of said tubes conducting pending reoperation of said switch, means responsive to current conduction by said one tube to selectively render a second or the third of said tubes conducting to supply their respective associated primary windings with unidirectional current pulses of said given polarity, means responsive to current conduction by said second tube to selectively render said third tube conducting, or to render said first mentioned means effective to again effect conduction of said one of said tubes, and means responsive to current conduction by said third tube to selectively render said second tube conducting or to render said first mentioned means effective to again effect conduction of said one tube.

7. For a welder having a movable electrode mounted on the armature of an electromagnet and having an energizing coil for said electromagnet arranged to be subjected to a portion of the welding current flowing through said electrode and the work to thereby increase the pressure on the work in proportion to the welding current; in combination, a polyphase alternating current supply source, a welding transformer having at least two primary windings and secondary winding means for connection in circuit with said electrode, at least two normally non-conducting electron tubes having control electrodes, each of said tubes having its main discharge path connected across an associated phase of said source in circuit with an associated primary winding, means in circuit with the control electrode of one of said tubes and said source and being operable to render said one tube conducting to supply its associated primary winding with a unidirectional current pulse, and means in circuit with the control electrode of another tube and being responsive to current conduction by said one tube to render said other tube conducting to supply its associated primary winding with a unidirectional current pulse of said given polarity.

8. For a welder having electrodes adapted to supply a welding current to the work to be welded and means responsive to the flow of said welding current in said work to squeeze the work an amount dependent upon the magnitude and duration of said welding current; in combination, a welding transformer comprising a plurality of primary windings and secondary winding means for connection in circuit with said electrodes, means in circuit with one of said primary windings to be energized from one phase of a polyphase source of supply and to supply said one winding with a pulse of unidirectional current of one polarity from said one phase, and means in circuit with said other of said primary windings to be energized from another phase of said source of supply and rendered operative in response to flow of said unidirectional pulse of current from said one phase to said one winding to supply said other winding with a pulse of unidirectional current of said one polarity from said other phase.

References Cited in the file of this patent

UNITED STATES PATENTS

| | | |
|---|---|---|
| 2,319,524 | Undy | May 18, 1943 |
| 2,329,122 | Leathers | Sept. 7, 1943 |
| 2,356,859 | Leathers | Aug. 29, 1944 |
| 2,477,117 | Cox | July 26, 1949 |
| 2,508,467 | Parsons et al. | May 23, 1950 |
| 2,600,519 | Solomon | June 17, 1952 |